Aug. 22, 1967       N. O. JOHANSSON ETAL       3,337,208
                    SPRING SUSPENSION DEVICE
Filed Oct. 15, 1965                          2 Sheets-Sheet 1

INVENTORS
NILS OLOV JOHANSSON
PER OLLE LENNART GUSTAFSSON
LARS OLOF LUNDIN
CLAES RUNE SVANSTRÖM
BY
ATTORNEYS

INVENTORS
NILS OLOV JOHANSSON
PER OLLE LENNART GUSTAFSSON
LARS OLOF LUNDIN
CLAES RUNE SVANSTRÖM

United States Patent Office 3,337,208
Patented Aug. 22, 1967

3,337,208
SPRING SUSPENSION DEVICE
Nils Olov Johansson, Per Olle Lennart Gustafsson, Lars Olof Lundin, and Claes Rune Svanström, Karlskoga, Sweden, assignors to Aktiebolaget Bofors, Bofors, Sweden, a corporation of Sweden
Filed Oct. 15, 1965, Ser. No. 496,623
Claims priority, application Sweden, Nov. 9, 1964, 13,474/64
8 Claims. (Cl. 267—64)

The present invention relates to a spring suspension device for absorbing shocks experienced by a running wheel of a vehicle. The invention is especially suitable with the driving and guiding wheels of a track-laying vehicle, such as an armored tank or a personnel carrier. More particularly, the invention relates to a spring suspension device of this kind comprising a linkage transmitting shocks to be absorbed to a piston slidable in a fluid filled hydraulic cylinder which coacts with a second hydraulic cylinder also filled with hydraulic fluid and preferably including a floating piston.

It is desirable, especially for certain fields of use of such spring suspension device, to produce a shock absorbing action in addition to the one which is obtainable with spring suspension devices of this kind as heretofore known. It is also desirable to dampen the initial movement of a wheel subjected to a shock out of its normal operational position more rapidly than the return movement of the wheel into its normal operational position.

It is an object of the invention to provide a novel and improved spring suspension device of the general kind above referred to which produces a stronger and more rapid shock absorbing action than is obtainable with a conventional spring suspension device of comparative size.

It is also an object of the invention to provide a novel and improved spring suspension device of the kind above referred to which produces a more rapid shock absorbing action in one direction than in the opposite one.

A more specific object of the invention is to provide a novel and improved spring suspension device of the general kind above referred to in which a damping valve is interposed between the first and the second hydraulic cylinder. This valve delays the exchange of hydraulic fluid between the two cylinders in one direction of exchange, preferably the direction in which the exchange of fluid is caused by a movement of the wheel out of its normal operational position.

The aforementioned objects, features and advantages and other objects, features and advantages which will be pointed out hereinafter are attained by providing a spring suspension device comprising a first hydraulic cylinder closed at one end, a piston slidable in said cylinder, shock transmitting means coupled to said piston for transmitting shocks to be absorbed thereto, a second hydraulic cylinder connected by a conduit with a closed fluid filled space in the first hydraulic cylinder, and a damping valve means included in the conduit for controlling the flow of hydraulic fluid therethrough. The valve means are so controlled that it will open a wider flow passage from one cylinder to the other in one direction than in the opposite direction whereby shocks transmitted to the piston are absorbed faster in said one direction than in said other direction.

The valve means, preferably, includes a valve member which has a generally frusto-conical configuration and is displaceable between a closing position in which it completely closes the fluid flow through the valve, intermediate positions in which the fluid flow through the conduit is throttled and a fully open position in which it opens the conduit substantially completely.

The invention further provides cushioning means which cushion movement of the valve member in either direction when the same approaches a limit position to avoid damage to the respective components of the valve means.

The invention will be more fully described in connection with the accompanying drawing in which a preferred embodiment of the invention is shown by way of illustration and not by way of limitation.

Figure 1:
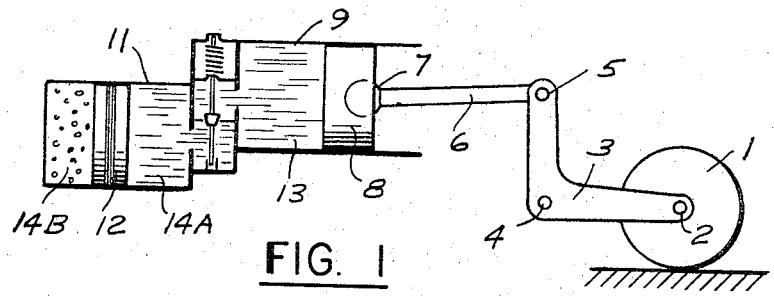
FIG. 1 is a diagrammatic view of a spring suspension device according to the invention.

Referring first to FIG. 1 in detail, the spring suspension device as exemplified in this figure coacts with a wheel 1 to absorb shocks experienced by this wheel. The wheel rotates about an axle 2 to which is fixedly secured a bell crank lever 3 pivotal about a pivot axis 4. The respective arm of this lever is hinged at 5 to a piston rod 6 which is coupled by a ball joint or other suitable hinge means indicated at 7 to a piston 8 slidable in a cylinder 9. As is evident, shocks experienced by wheel 1 and manifesting themselves in upward or downward movements of the wheel in reference to its supporting base cause a corresponding displacement of cylinder 8 in the respective direction. The cylinder is open at one end for insertion of the piston but closed at its opposite end. The closed space 13 thus formed is filled with a suitable hydraulic fluid such as oil and communicates by a conduit 9A with a second hydraulic cylinder 11. The second hydraulic cylinder preferably includes a free-floating piston 12 to define two cylinder spaces 14A and 14B. Cylinder space 14A, which communicates with conduit 9A, is also filled with hydraulic fluid and the cylinder space 14B is preferably filled with a pressurized inert gas, such as nitrogen. As it is evident, cylinder 11 constitutes a pressure storage cylinder.

The flow of oil between cylinder spaces 13 and 14A is controlled by a valve 10 which will be more fully described in connection with FIGS. 2 through 5.

The valve as shown in these figures comprises a valve housing 15 including a valve chamber in which is lengthwise slidable a valve member 16. The valve member has two shoulders 17 and 18 which abut against two cylindrical sleeves 19 and 20. A loaded coil spring 21 disposed between the sleeves biases the valve member against displacement in either direction.

The valve member further comprises a valve collar 22, 24 and 25. The collar is of generally frusto-conical cross section. Its wide substantially flat side 24 faces upwardly as seen in the figures and is continued by the narrow substantially cylindrical surface 22. The cylindrical surface, in turn, is continued by the conical portion 25 of the collar. The cylindrical surface coacts with an annular portion 23 defining a constriction which constitutes the valve opening and forms the valve seat proper.

Figure 2:
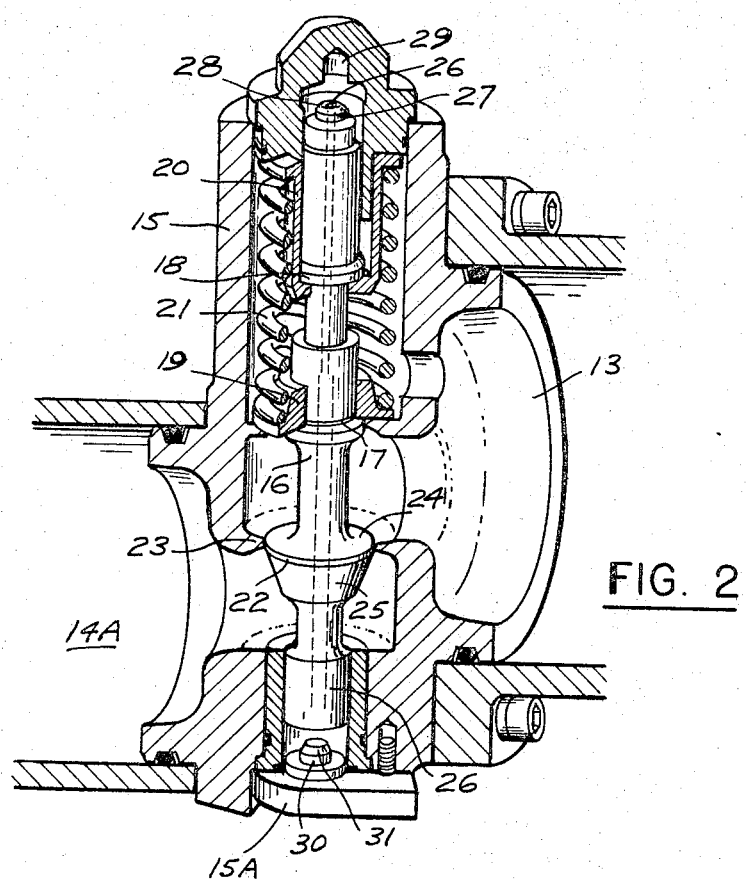
FIG. 2 is an elevational perspective view of the damping valve in its passage closing position.

The valve is fully closed when the valve member is in the position of FIG. 2, that is, when the cylindrical surface 22 of the valve member is in engagement with valve seat 23.

The valve member includes an axial bore 26 extending throughout the entire length of the valve member. The bore also extends through a boss 27 protruding at the end of the valve member adjacent to an axial bore 29 filled with a suitable hydraulic fluid such as oil. The boss is inwardly tapered at 28 and is engageable with the axial bore, preferably with a slight play. The diameter of this bore is approximately equal to the outer diameter of the cylindrical portion of boss 27.

Figure 5:
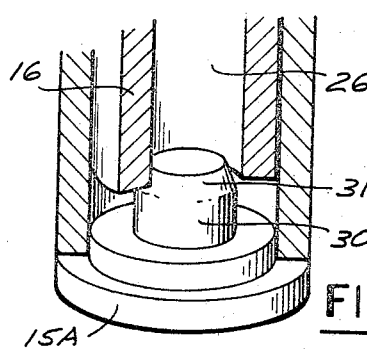
FIG. 5 is a fragmentary detail view of the valve on an enlarged scale.

As can best be seen in FIG. 5, the opposite end of bore 26 is engageable with a boss 30 formed directly on the housing, or on a separate wall member part 15A which is suitably secured to the housing proper and may be spring loaded in reference thereto. Boss 30 also has a cylindrical portion and an inwardly tapered portion 31, the latter fitting bore 26, preferably with a slight play. The chamber space closed by wall member 15A is filled with a suitable hydraulic fluid such as oil.

The spring suspension device as hereinbefore described operates as follows:

Let is be assumed that wheel 1 is not subjected to any shock. Then the pressures in cylinder spaces 13 and 14A are equal and the valve is in the position of FIG. 2, that is, the position in which the conduit 9A between cylinder spaces 13 and 14A is closed.

Let is now be assumed that wheel 1 experiences a shock, for instance, due to encountering an obstruction which causes the wheel to move upwardly. Such upward movement of the wheel is transmitted to piston 8 via bell crank lever 3, pivot pin 5, piston rod 6 and ball joint 7. Accordingly, the piston will be displaced towards the left, that is, toward damping valve 10. As a result, the pressure in cylinder space 13 increases. This pressure acts upon the collar surface 24 which is substantially plane and also substantially parallel to the longitudinal axis of the valve member. Accordingly, the valve member is forcefully displaced downwardly, that is, into the position of FIG. 3. As it is evident, even a comparatively small downward displacement of valve member 16 in reference to the valve seat 23 opens a wide flow passage between cylinder chambers 13 and 14A due to the aforedescribed configuration of the surface 24. When the displacement of a piston 8 by a heavy shock is such that the valve member approaches its lower limit position, boss 30 will begin to enter bore 26 as it is shown in FIG. 5. As the oil in the space closed off by the wall member 15A supporting boss 30 can only slowly escape into bore 26 through the narrow flow passage provided between the tapered portion 31 of the boss and the adjacent wall of valve member 16, the further downward movement of the valve member is effectively cushioned.

Figure 3:
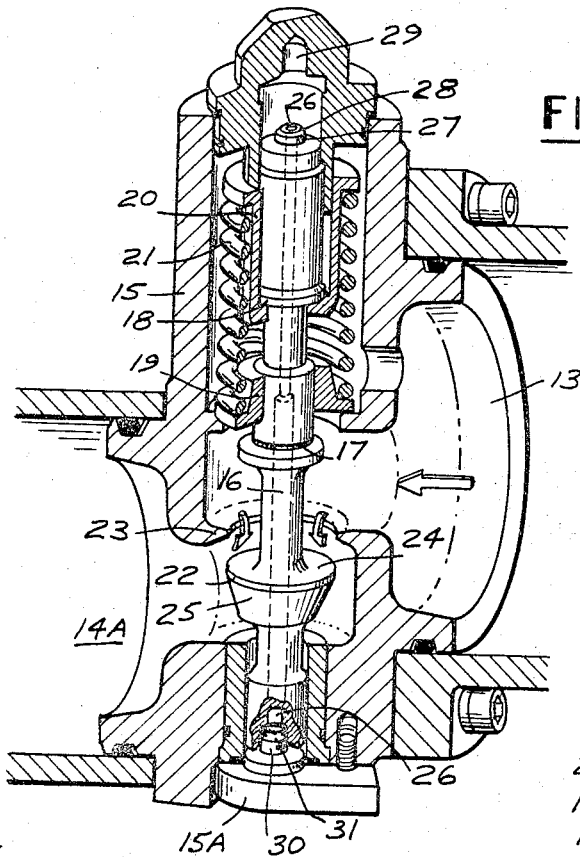
FIG. 3 is a view similar to FIG. 2 but showing the valve in a position fully opening the flow passage.
Figure 4:
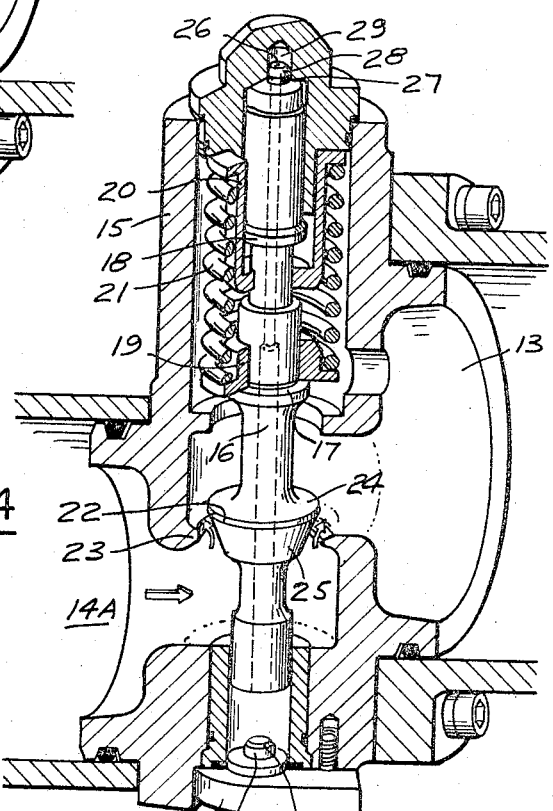
FIG. 4 is a view similar to FIGS. 2 and 3, but showing the valve in a position partly opening the flow passage.

When now the effect of the shock subsides and piston 8 remains at a standstill, the higher oil pressure in cylinder space 13 will move piston 8 in the direction away from the valve. As a result, the now higher oil pressure in cylinder space 14A which acts upon the conical collar surface 25 will cause the valve member 16 to move upwardly. However, due to the comparatively slight conicity of the collar surface 25, the flow passage made now available between cylinder spaces 13 and 14A is considerably smaller than the flow passage which was made available upon downward movement of the valve member as shown in FIG. 3. Accordingly, the restoration of the pressure balance between the cylinder spaces 14A and 13 is much slower than it was during the initial downward movement of the valve member in reference to its valve seat due to the increase of oil pressure in cylinder space 13. In other words, the shock absorbing action is more powerful and rapid when wheel 41 is forced upwardly in reference to its support than when it moves downwardly into its initial position.

As it is evident, the upward movement of valve member 16 is also cushioned when the valve member approaches its upper position. The escape of the oil in bore 29 is throttled by the narrow escape flow passage provided between the tapered portion 28 of boss 27 and the adjacent wall portion of valve housing 15.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

We claim:

1. A spring suspension device comprising, in combination, a first hydraulic cylinder closed at one end, a piston slidable in said cylinder, shock transmitting means coupled to said piston for transmitting shocks to be absorbed thereto, said cylinder defining a closed space filled with hydraulic fluid between the closed cylinder end and the respective side of the piston, a second hydraulic cylinder filled with hydraulic fluid, a conduit connecting said closed space in the first cylinder with the second hydraulic cylinder and a damping valve means included in said conduit for controlling the flow of hydraulic fluid therethrough, said valve means including a displaceable flow control means, said control means being displaceable by a pressure differential between a hydraulic fluid pressure in said closed cylinder space and a hydraulic fluid pressure in said second cylinder between a position closing the conduit for a fluid flow between the two cylinders and a position opening the conduit for such flow, said control means permitting in said flow opening position a greater fluid flow between the two cylinders in one direction than in the opposite direction.

2. A spring suspension device comprising, in combination, a first hydraulic cylinder closed at one end, a piston slidable in said cylinder, shock transmitting means coupled to said piston for transmitting shocks to be absorbed thereto, said cylinder defining a closed space filled with hydraulic fluid between the closed cylinder end and the respective side of the piston, a second hydraulic cylinder filled with hydraulic fluid, a conduit connecting said closed space in the first cylinder with the second hydraulic cylinder, and a damping valve means included in said conduit for controlling the flow of hydraulic fluid therethrough, said valve means comprising a valve housing including a valve seat defining a valve opening and a valve member displaceable in either direction in reference to said seat for controlling the flow of fluid through the conduit, the position of said valve member being controlled by a pressure differential between a hydraulic fluid pressure in said closed cylinder space and a hydraulic fluid pressure in said second cylinder, said valve member having a configuration such that in any position of displacement thereof in reference to the valve seat the flow passage through the conduit then opened by the valve member for a fluid flow between the two cylinders in one direction is greater than the flow passage for the fluid flow in the opposite direction.

3. A spring suspension device according to claim 2, wherein said valve member has a generally frusto-conical configuration and is displaceable between a closed position in which said valve member engages the valve seat with its portion of maximal diameter thereby closing the valve opening defined by the valve seat, an open position in which the valve member is completely withdrawn from the valve opening with the wide flat side of the valve member facing the valve opening thereby substantially completely uncovering the same, and intermediate positions in which the conical portion of the valve member is within said valve opening thereby partly blocking the same.

4. A spring suspension device according to claim 3, wherein said valve member has a narrow cylindric portion adjacent to its wide end, said cylindric portion being engageable with said valve seat to effect closing of the valve opening.

5. A spring suspension device according to claim 2 and comprising a double-acting spring means biasing said valve member against displacement in either direction in reference to said valve seat.

6. A spring suspension device according to claim 2 and comprising a cushioning means at both ends of the valve housing adjacent to either end of said valve member for cushioning the latter upon displacement of the valve member in either direction toward a limit position in the housing.

7. A spring suspension device according to claim 6, wherein said cushioning means at one end of the valve housing comprises a fluid filled cushioning chamber formed in the valve housing, said chamber being engageable by an end portion of the valve member, said valve member having an axial bore extending throughout the length thereof, said end portion being received in said cushioning chamber when the valve member approaches the respective limit position whereby the narrow flow passage defined by said end portion between the bore and the chamber restrains displacement of the fluid from the chamber into the bore thus cushioning the valve member movement into the respective direction.

8. A spring suspension device according to claim 6, wherein said cushioning means at the other end of the valve housing comprises a fluid filled cushioning chamber formed in the valve housing, said valve member having an axial bore extending throughout the length thereof, and a boss protruding from an end wall portion of the housing in alignment with said bore, said boss being received in said bore when the valve member approaches the respective limit position whereby the narrow flow passage defined between the boss and the bore restrains displacement of the fluid from the chamber into the bore thus cushioning the valve member movement into the respective direction.

No references cited.

ARTHUR L. LA POINT, *Primary Examiner.*

R. M. WOHLFARTH, *Assistant Examiner.*